(12) United States Patent
Daniel et al.

(10) Patent No.: US 9,262,369 B1
(45) Date of Patent: Feb. 16, 2016

(54) APPARATUS AND METHOD FOR ACCELERATED PAGE LINK LIST PROCESSING IN A PACKET PROCESSOR OPERATING AT WIRESPEED

(71) Applicant: Xpliant, Inc., San Jose, CA (US)

(72) Inventors: Tsahi Daniel, Palo Alto, CA (US); Enric Musoll, San Jose, CA (US); Dan Tu, San Bruno, CA (US); Sridevi Polasanapalli, San Jose, CA (US)

(73) Assignee: Xpliant, Inc., San Jose, CA (US)

( * ) Notice: Subject to any disclaimer, the term of this patent is extended or adjusted under 35 U.S.C. 154(b) by 0 days.

(21) Appl. No.: 14/676,791

(22) Filed: Apr. 1, 2015

Related U.S. Application Data

(63) Continuation of application No. 14/142,643, filed on Dec. 27, 2013, now Pat. No. 9,009,364.

(60) Provisional application No. 61/873,291, filed on Sep. 3, 2013.

(51) Int. Cl.
- *G06F 13/28* (2006.01)
- *G06F 15/167* (2006.01)
- *H04L 12/825* (2013.01)

(52) U.S. Cl.
CPC .............. *G06F 15/167* (2013.01); *H04L 47/25* (2013.01)

(58) Field of Classification Search
None
See application file for complete search history.

(56) References Cited

U.S. PATENT DOCUMENTS

| | | | |
|---|---|---|---|
| 6,088,758 A * | 7/2000 | Kaufman | G06F 12/0824 709/213 |
| 7,113,985 B2 * | 9/2006 | Narad et al. | 709/221 |
| 7,133,922 B1 | 11/2006 | She et al. | |
| 7,336,606 B2 * | 2/2008 | Romano et al. | 370/230 |
| 7,689,774 B2 | 3/2010 | O'Connell et al. | |
| 7,818,389 B1 | 10/2010 | Chiang et al. | |
| 8,019,825 B1 | 9/2011 | Johnston et al. | |
| 8,612,711 B1 | 12/2013 | Griffin | |
| 8,645,494 B1 * | 2/2014 | Altman | H04L 67/02 709/203 |
| 2002/0138700 A1 * | 9/2002 | Holmberg | G06F 9/3802 711/137 |
| 2005/0034136 A1 | 2/2005 | Engstrom et al. | |
| 2008/0051113 A1 * | 2/2008 | Willey | H04W 68/025 455/458 |
| 2008/0250208 A1 | 10/2008 | O'Connell et al. | |
| 2009/0175286 A1 * | 7/2009 | Naven et al. | 370/412 |
| 2010/0042755 A1 | 2/2010 | Fuente et al. | |
| 2011/0085570 A1 | 4/2011 | Kotha et al. | |
| 2011/0167170 A1 | 7/2011 | Kovvali et al. | |

* cited by examiner

*Primary Examiner* — Michael Sun
(74) *Attorney, Agent, or Firm* — Cooley LLP

(57) ABSTRACT

A packet processor has a packet memory manager configured to store a page walk link list, receive a descriptor and initiate a page walk through the page walk link list in response to the descriptor and without a prompt from transmit direct memory access circuitry. The packet memory manager is configured to receive an indicator of a single page packet and read a new packet in response to the indicator without waiting to obtain page state associated with the page of the single page packet.

5 Claims, 8 Drawing Sheets

APPARATUS AND METHOD FOR ACCELERATED PAGE LINK LIST PROCESSING IN A PACKET PROCESSOR OPERATING AT WIRESPEED

CROSS-REFERENCE TO RELATED APPLICATION

This application is a continuation of U.S. patent application Ser. No. 14/142,643 filed on Dec. 27, 2013, which claims priority to U.S. Provisional Patent Application Ser. No. 61/873,291, filed Sep. 3, 2013, the contents of which are incorporated herein by reference.

FIELD OF INVENTION

This invention relates to processing packets in a computer network. More particularly, this invention relates to techniques for accelerated page link list processing.

BACKGROUND

A packet processing device usually needs to buffer packets into a packet memory (PM) while the device processes them. The size of some packets (for example Ethernet packets) is not known in advance so the device needs to start storing the packet into the packet memory without knowing how large the packet is. Moreover, packets arrive at the device in an interleaved fashion, so the device is simultaneously storing several incoming packets into the packet buffer The state of the art solution to store the packet in the device's memory is to assign multiple chunks (called pages) of packet memory to each packet, rather than a single big chunk. With this scheme, the packet is not stored consecutively in the packet memory, but rather is scattered in one or more pages throughout the packet memory. Therefore, a memory manager needs to maintain a linked list of all the pages that a particular packet uses in the packet memory; this linked list is traversed when the packet is read out of the packet memory for transmission.

FIG. 1 illustrates a Packet A with contents that are sequentially written in packet memory as Page Q, Page P, Page S and Page R. Each page has associated page state in a memory manager. As shown in FIG. 1, the page state may include:

A pointer to the next page;
Whether the page contains the start-of-packet (SOP) and/or the end-of-packet (EOP) attribute of the packet;
The valid bytes stored in the page (usually only relevant for the last page, where not all the page contains valid data);
. . . .

The state of all the pages in the packet processor device is maintained by the memory manager. A packet has an associated descriptor that in its basic form is the pointer to the first page. With this initial pointer, all the pages used by the packet can be retrieved in the same order they were used by traversing the link list built from the next page pointers in the different page states.

Moreover, in a state of the art packet processing device, incoming packets are stored into the packet memory by a specialized direct-access memory (DMA) block (henceforth named Receive DMA or RDMA), and outgoing packets are retrieved from the packet memory by another DMA block (henceforth named Transmit DMA or TDMA).

FIG. 2 depicts the basic interaction between packet memory 200, TDMA 202, memory manager 204 and control elements 206. By way of example, the control elements may include a header processor, a header DMA, a transmission queue and the like. The three main functions of the control block are to perform any necessary modification of the packet, decide where to send the packet and perform any traffic management. For the purpose of this disclosure, the control block provides the packet descriptor to the TDMA, which is responsible from that point on to read the packet data from packet memory and send it out to the egress port.

The sequence of events is the following:

TDMA 202 is ready to send on a particular egress port, so TDMA requests 210 the control block for a descriptor for a packet to be sent to that egress port;
Control 206 sends the descriptor 212 if it has one;
TDMA 202 starts performing the page state link list walk by issuing requests 214 to the memory manager 204, which supplies page state 216;
For each page state, the TDMA 202 performs one or more requests 218 to the packet memory 200 to obtain the packet data 220; and
TDMA 202 sends the packet data to the egress port.

FIG. 2 shows that the TDMA is responsible for performing the page link list walk, which requires, for each of the page states, a request (containing the page's pointer) to the memory manager, the memory manager reading the page state from its internal memory, and the memory manager returning the contents of the page state to the TDMA.

It is important to note that in order to request the state of the next page, the TDMA needs to have received the state of the current page (which contains the pointer to the next page). Therefore, there is a potentially large latency (in clock cycles) from the time the TDMA requests page state until it can request the next page state. FIG. 2 shows that this latency is twice Latency BT (for the request to the memory manager and for the return from the memory manager) plus Latency B (for the internal latency in the memory manager to obtain the page state).

This latency can become an issue depending on the size of the page and the speed (bits per second) of the egress port. The higher the speed of the port:

The higher the rate of return of page states to the TDMA needs to be;
The larger the page size (how much packet data each page holds) needs to be (however for small-size packets, a larger page size will not help);
The rate of page state returns (in clock cycles) is limited by several factors:
How far apart in the device (usually a chip) the TDMA and memory manager are; the farther apart, the higher the latency; and
The individual packet memory and TDMA latencies in reading the page state and requesting the next page, respectively.

The page size is limited by the packet memory utilization: the larger the page size, the lower the packet memory utilization becomes because the percentage of a page that is not used increases with its size. This memory inefficiency becomes more prominent for small-size packets. Reducing the unused portion of the buffer memory by having smaller pages enables a smaller packet buffer, thus saving precious on-chip area for other packet processing functions.

Not meeting wire speed on an egress port is very undesirable because it translates into under run errors. An under run error occurs when a packet has started to be transmitted on a port and the driver of the packet data to the port (in this case the TDMA) fails to provide some of the data of the packet at the rate that is dictated by the speed of the port. When an under run error on a packet occurs, the receiving party discards the packet, and the same packet usually needs to be retransmitted again, causing performance degradation on the network.

Consequently, it is a strong requirement to meet the wire speed of the egress ports (so no under run errors occur), but it is non-trivial to achieve this goal given the implementation challenges of a high page state return rate and and/or a large page size.

SUMMARY OF THE INVENTION

A packet processor has a packet memory manager configured to store a page walk link list, receive a descriptor and initiate a page walk through the page walk link list in response to the descriptor and without a prompt from transmit direct memory access circuitry. The packet memory manager is configured to receive an indicator of a single page packet and read a new packet in response to the indicator without waiting to obtain page state associated with the page of the single page packet.

A packet processor has a packet memory manager configured for cut-through operation so as to guarantee that the state of a first page of a packet is written by the time the descriptor of the packet is received. A first latency is applied to a second page of the packet, where the first latency is the difference between the latency of a packet processor ingress port to fill a full page with packet data and the maximum latency of a control block issuing a descriptor. A second latency is applied to each additional page of the packet, where the second latency is the latency of the packet processor ingress port to fill a full page with packet data.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION

An embodiment of the invention reduces the latency between two consecutive page state requests (or equivalently increases the rate of page requests) by moving the walk of the page state link list from the TDMA to the memory manager. Since the memory manager is the owner of the link list, once it has read the state of a particular page it can immediately start reading the state of the next page without waiting for the TDMA to request it.

Figure 1:
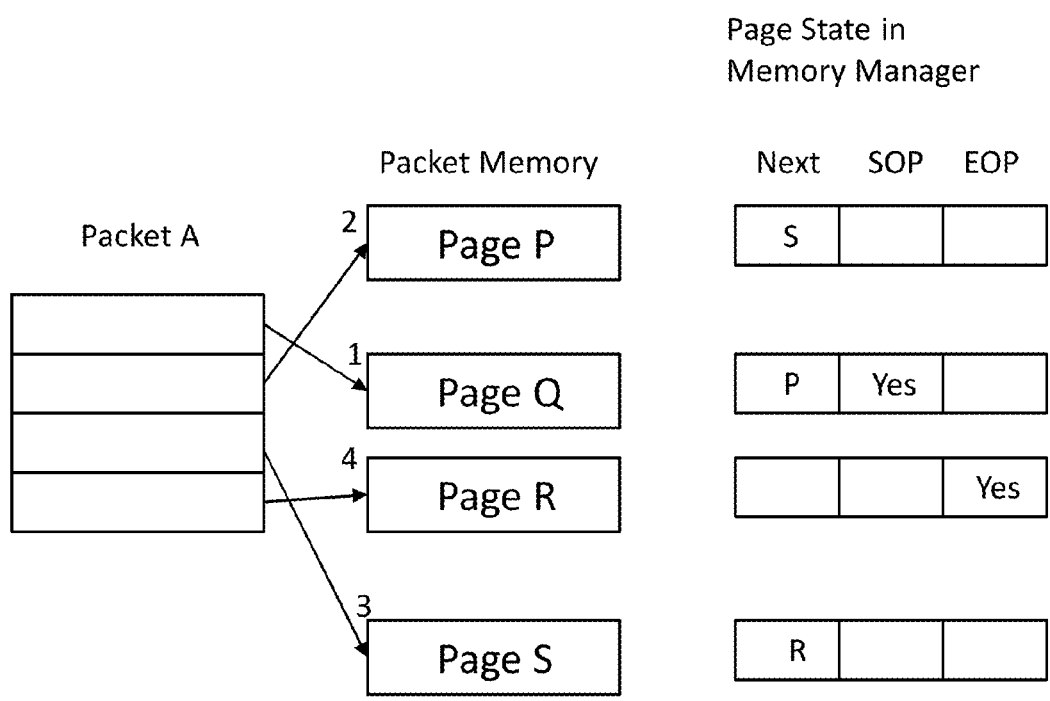
FIG. 1 shows a packet's page link list processed in accordance with the prior art.
Figure 2:
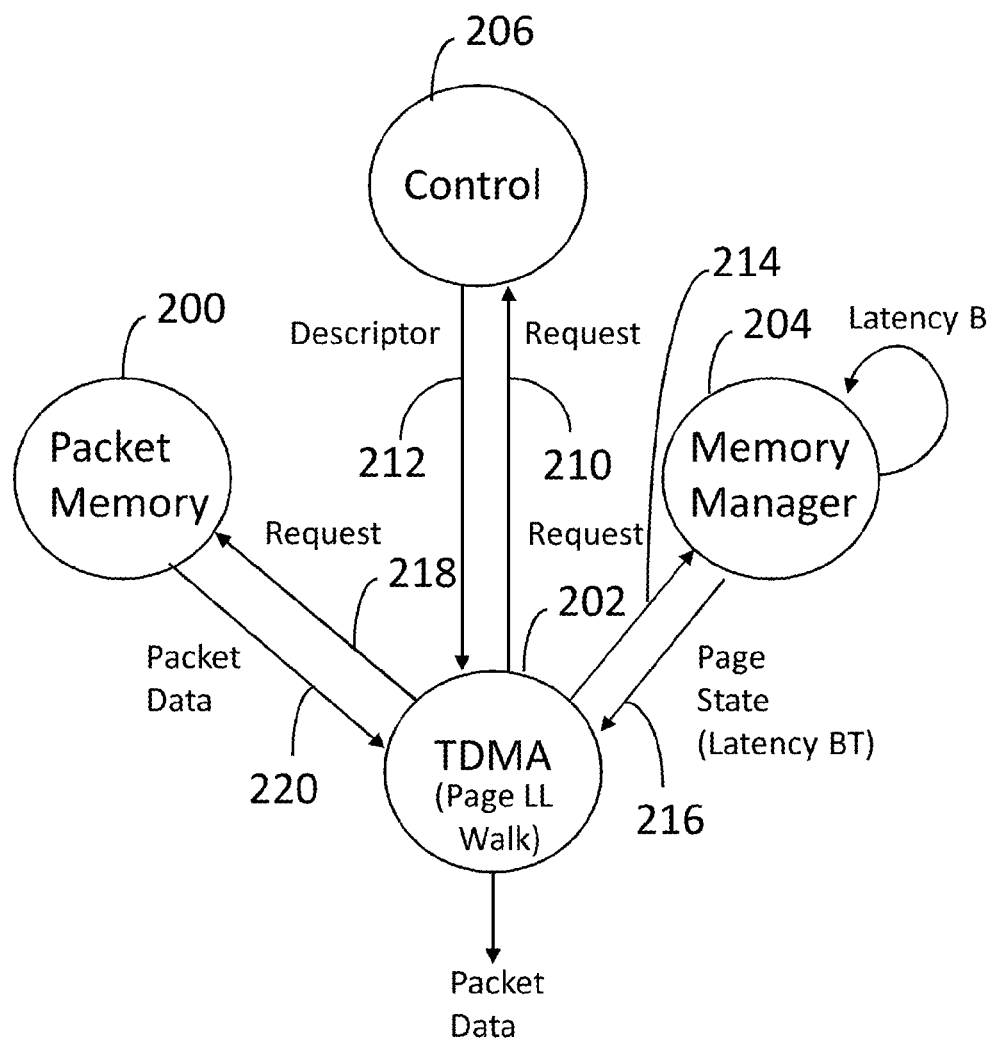
FIG. 2 shows interactions among a packet memory, a memory manager, control elements and a Transmittal Direct Memory Access (TDMA) block performing a page link list walk in accordance with the prior art.
Figure 3:
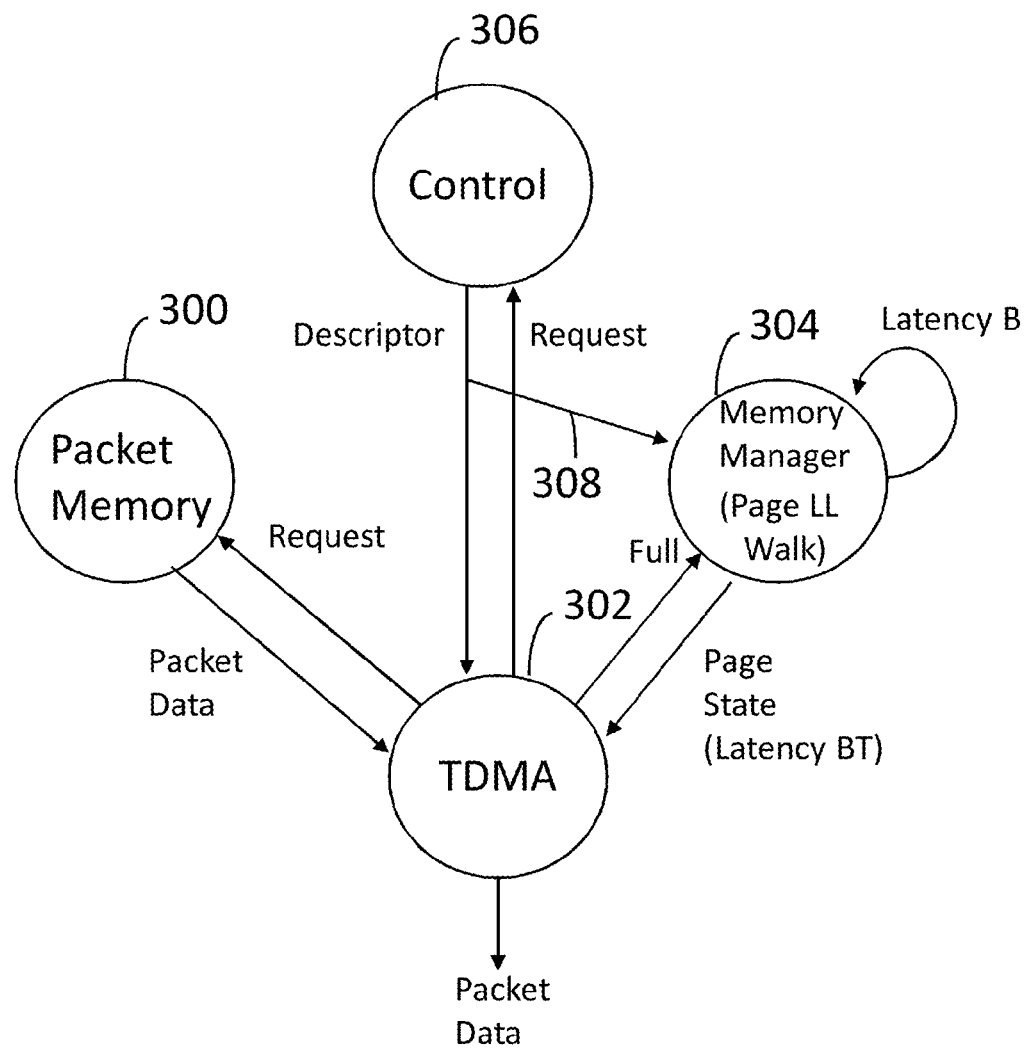
FIG. 3 shows interactions among a packet memory, a memory manager, control elements, a Transmittal Direct Memory Access (TDMA) block, and a memory manager performing a page link list walk in accordance with an embodiment of the invention.

FIG. 3 illustrates that the memory manager 304 performs the page link list walk. A descriptor from the control block 306 is passed to the TDMA 302. The same descriptor is also passed to the memory manager, as shown with line 308.

An exemplary sequence of events is as follows:

The TDMA 302 is ready to send packets to a particular egress port, so the TDMA 302 requests from the control block 306 a descriptor for a packet to be sent to that egress port;

Control block 306 sends the descriptor, if it has one, to both the TDMA 302 and the memory manager 304;

The memory manager 304 starts performing the page state link list walk and sends the page states to the TDMA 302;

If the TDMA 302 is not ready to process the page states, it buffers them until it has no more space, at which point it flow controls the memory manager 304 (using the full signal shown in FIG. 3). The TDMA 302 needs to be able to absorb any in-flight page state that the memory manager has sent before sampling the full signal;

For each page state, the TDMA 302 performs one or more requests to the packet memory 300 to obtain the packet data;

The TDMA 302 sends the packet data to the egress port.

Note that the rate of page states has increased since now the latency between two page states is just Latency B. Moreover, the latency that the TDMA 302 sees for the first page state also has been reduced. In the baseline approach, this latency was Latency BT+Latency B+Latency BT whereas now it is (Latency CB−Latency CT)+Latency B+Latency BT It has then been reduced by Latency BT−(Latency CB−Latency CT)

That is, it has been reduced by the full Latency BT and by the difference in path latencies Control to BM (CB) and Control to TDMA (CT). In other words, this method is even better if the Latency CB is smaller than Latency CT.

The foregoing approach can be improved in the case of small-size packets that fit in a single page. In this case, the page state return rate has to be very high in order to meet the port wire speed. Because the packet is small, the port speed may dictate that the next page (corresponding to the next packet) needs to be available at the TDMA faster than the maximum rate of 1/(Latency of the memory manager). This is because the TDMA processes the data in the page faster since there is less data in each page.

Figure 4:
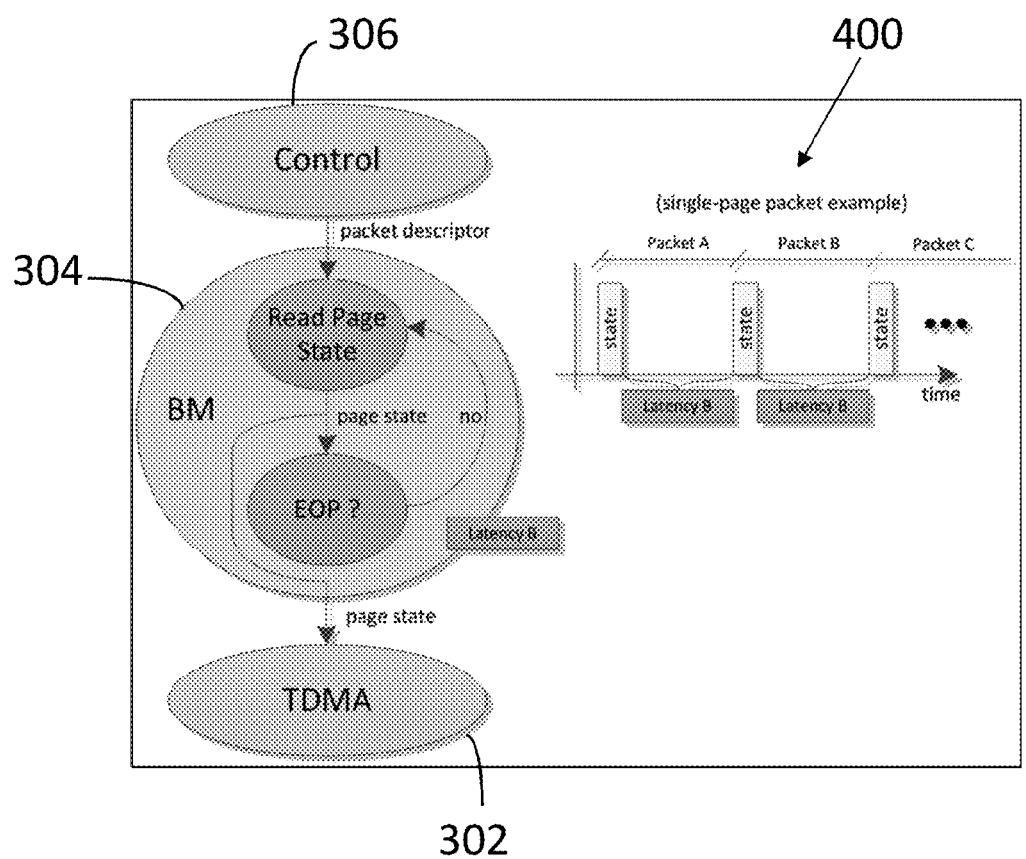
FIG. 4 shows rate of page states associated with a memory manager (also referred to as buffer manager or BM).

The reason for the maximum rate in the foregoing example is shown in FIG. 4. The memory manager 304 cannot start the reading of the next page state until it has read the current page state from the control block 306. Only after the state of the current page has been read can the next page state for the packet be read (using the next page pointer) or, if the current page corresponds to the EOP, the first page of that new packet can be read. Time line 400 illustrates that for packet A, there is a "state" time lag and then a "Latency B" time lag. The same delay occurs for subsequent packets.

For the particular case of small-size packets (where the whole packet fits in a page), the TDMA reads less data per each page state it gets from the memory manager. Consequently, the TDMA needs to obtain the page states at a higher rate. In this scenario, the maximum rate of 1/(Latency of the memory manager) may not be enough for an under run-free operation depending on the packet size and the port speed.

Figure 5:
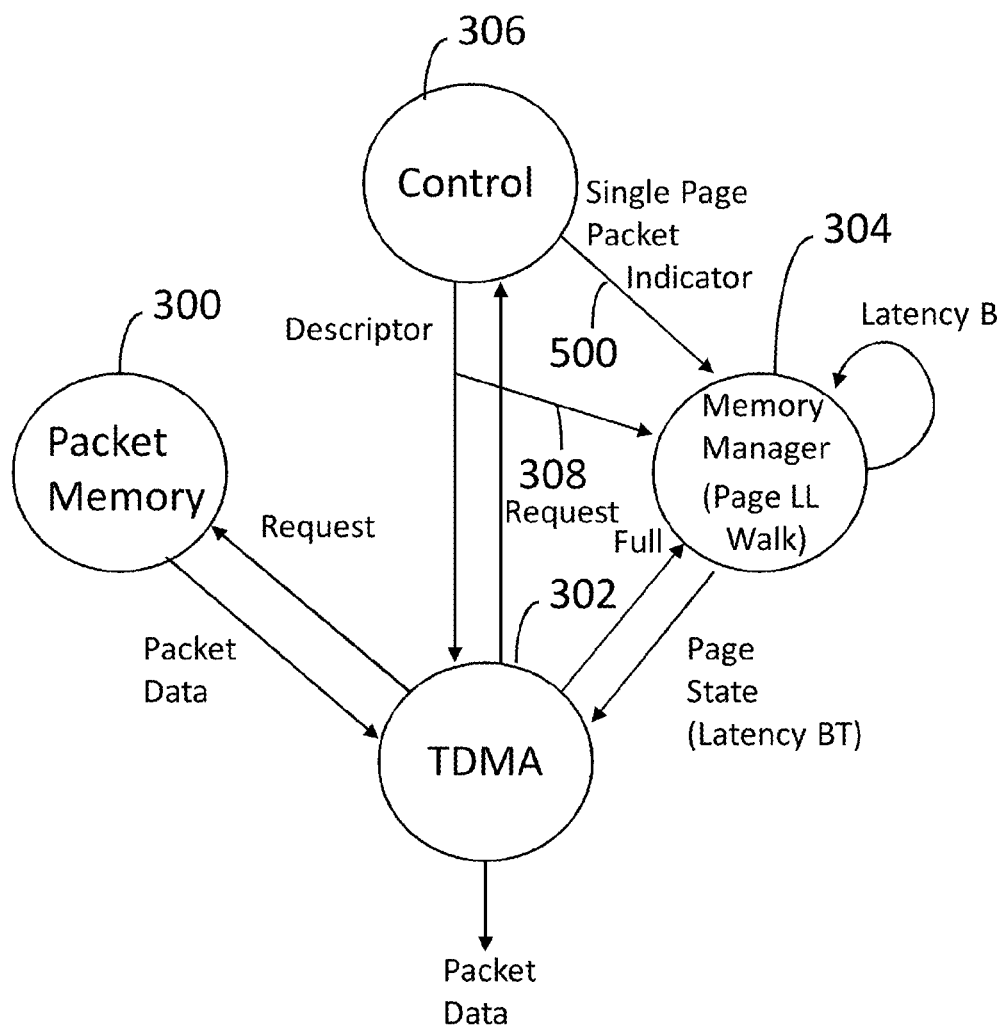
FIG. 5 shows single page packet notification and processing performed in accordance with an embodiment of the invention.

A solution to this problem is for the control block to provide additional information to the memory manager that indicates how many pages the packet has. In the case of single-page packets, this information is just a single bit (single-page packet) as shown with line 500 in FIG. 5.

Figure 6:
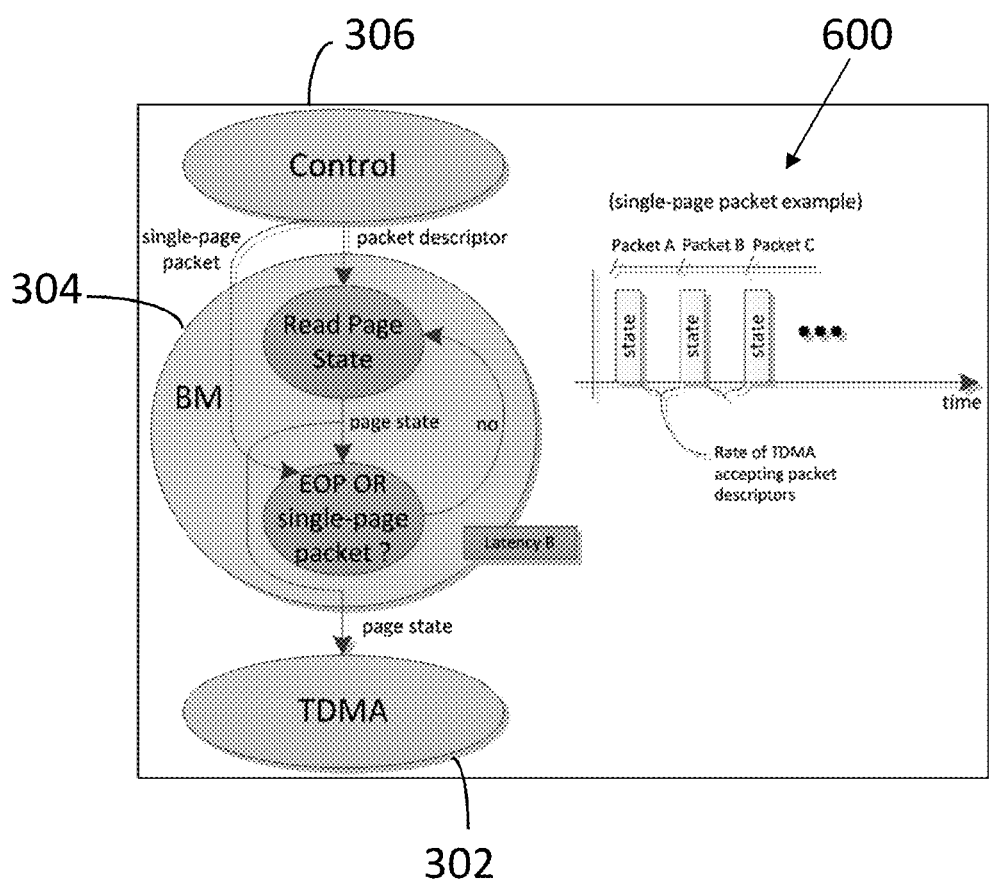
FIG. 6 shows rate of page states for a memory manager configured in accordance with an embodiment of the invention.

Now the memory manager 304 knows that the descriptor corresponds to a packet that uses a single page only, and can start the reading of the next page (that corresponds to the next packet) right away after reading the current page without waiting to obtain the result. This is depicted in FIG. 6. In particular, FIG. 6 illustrates the memory manager 304 receiving an indication of a single page packet, which triggers the reading of page state, just as in the case of an end of packet (EOP) condition.

For a stream of small packets, the rate of page states to the TDMA has increased (i.e., its latency has been reduced to the Latency of the memory manager), and the effective rate is now the rate at which the TDMA can accept descriptors from the control block. Timeline 600 of FIG. 6 illustrates that the latency is largely attributable to fetching state, as opposed to the latency of the memory manager, as was the case with timeline 400 of FIG. 4.

Note that it is assumed here that descriptors corresponding to packets to be sent on a particular egress port need to be processed in the same order that the control block provides them. This is a requirement if the packets correspond to the same 'flow', but it is not needed otherwise. Therefore, a different approach to solving the page-state rate would be to include the packet flow information, and allow parallel processing of packets that belong to different flows. However, besides increasing the complexity of the implementation, the fundamental issue still remains if the stream of small-size packets corresponds to packets of the same flow.

Packet processing devices may wait to start the transmission of a packet until all pages of the packet have been received, or may decide to start its transmission while pages are still being received. The first option, called store-and-forward, is used in the case where the device should not send the packet if the packet has incurred an error while it has been received by the device or when the content of the packet may be modified based on packet data that still has not been received.

The second option, called cut-through, is used in low latency devices where the packet data is sent as soon as the processing of the packet commences. Future errors in receiving the packet data will be made known to the TDMA, which will tag the packet with a bad Frame Check Sequence (FCS) field. Note that cut-through mode only applies to those packets that are received by an ingress port that has a speed that is higher or the same as the egress port to which the switched packet will be transmitted.

Figure 7:
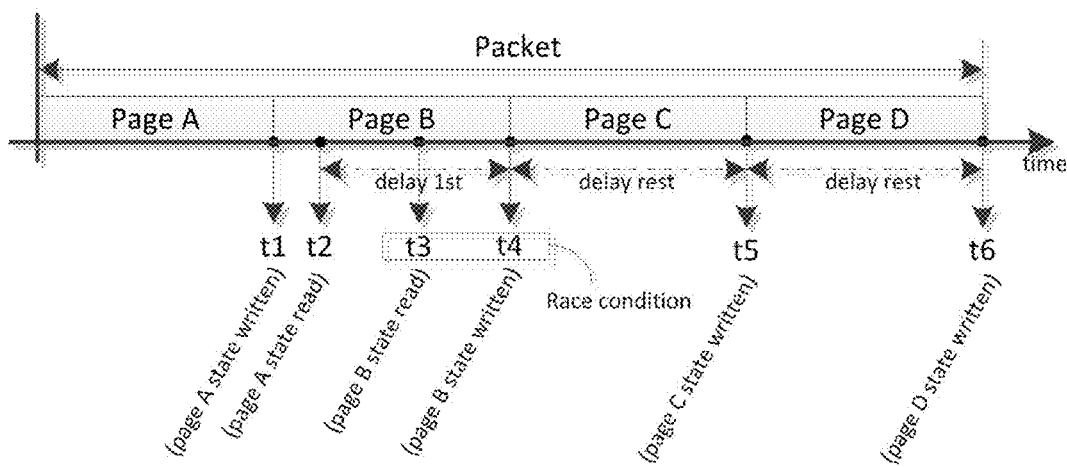
FIG. 7 is an example of page state race conditions.

In cut-through mode there is a race condition when accessing a page state in which the memory manager may read a page state before that state has been written. This race condition is depicted in FIG. 7. A 4-page packet (Page A, Page B, Page C and Page D) is shown in FIG. 7. The state of the first page (A) is written at t1. The memory manager will not read the state of page A before t1 because the descriptor of the packet will arrive at the memory manager sometime after the state of page A has been written (since the implantation guarantees that the state of the first header page has been written by the time the descriptor arrives at the memory manager). The memory manager reads page A's state at t2.

Thereafter, the memory manager may read the state of the next page (page B) at t3, which is before page B's state is written at t4 (when all the data is received). Therefore, there is a race condition: the memory manager reads the state of page B before the state is updated, causing a functional error in the device due to stale state being read.

A solution to this problem comprises delaying the reading of page B by a certain delay (shown as 'delay 1st' in FIG. 7) so that ideally the page state is read right after it is written. A conservative value for this delay is the time it takes for the ingress port to receive packet data to fill a full page, thus guaranteeing that page B would have been written and its state updated. However, this conservative delay may cause under run errors if t3 is close to t4. In this case, the actual time that the memory manager would read page B's state is close to two pages worth of packet data from the time pages A's state was read, as opposed to the ideal of one. This relatively large wait time between reading page A's state and page B's state may cause the TDMA to run out of packet data to send to the port, causing under run errors.

Therefore, this 'delay 1st' value needs to take into account the latency from the time page A's state has been written until the descriptor is sent to the memory manager. This latency mainly includes the time spent being processed in the control block. This 'delay 1st' latency should then be:

Latency to fill a page−Max(Latency in control block)

The latency to fill a page is dependent on the speed of the ingress port. Usually the speed of both ingress and egress ports are the same. The case where the ingress port is slower than the egress port is not applicable to cut-through mode. For the case when the egress port is slower, the speed is determined by the egress port. Therefore, in any case the speed information needed by the memory manager to obtain the proper delay value can be derived from the egress port information in the descriptor provided by the control block.

Figure 8:
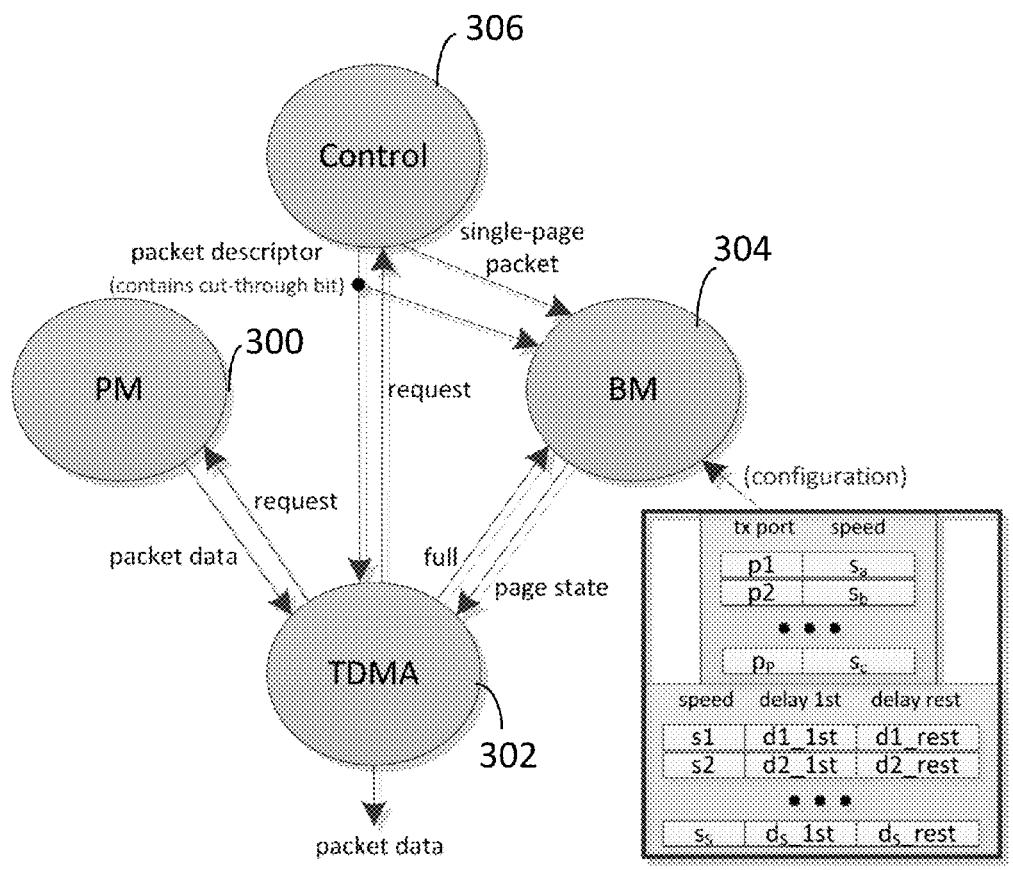
FIG. 8 shows a page state read delay configuration in cut-through mode utilized in accordance with an embodiment of the invention.

This is shown in FIG. 8. In one embodiment, the memory manager 304 indexes a set of tables (part of the memory manager's configuration) that provides the proper value for 'delay $1^{st}$'. This is only needed if the packet is transmitted in cut-through mode, so this information is also needed by the memory manager, which the control block should provide.

Once page B has been read, a different delay needs to be applied to read the rest of the pages. This delay corresponds to the time it takes for the ingress port to fill a full page with packet data. This delay is labeled as 'delay rest' in FIG. 8, and it is also obtained by the memory manager by indexing the configuration table shown in FIG. 8.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A packet processor, comprising:
 a packet memory manager configured to
  store a page walk link list;
  receive a descriptor of a first packet;
  initiate a page walk through the page walk link list in response to the descriptor of the first packet and without a prompt from transmit direct memory access circuitry;
  receive an indicator that the first packet is a single page packet; and
  read a second packet in response to the indicator without waiting to obtain page state associated with the first packet.

2. The packet processor of claim 1 wherein the indictor is a single bit.

3. The packet processor of claim 1 wherein the packet memory manager is further configured to
 guarantee that the state of a first page of a packet is written by the time the descriptor of the packet is received;
 apply a first latency to a second page of the packet, wherein the first latency is the difference between the latency of a packet processor ingress port to fill a full page with packet data and the maximum latency of a control block issuing a descriptor; and
 apply a second latency to each additional page of the packet, wherein the second latency is the latency of the packet processor ingress port to fill a full page with packet data.

4. A packet processor, comprising:
 a packet memory manager configured to
  receive a single bit indicator that a first packet is a single page;
  read a second packet in response to the single bit indicator without waiting to obtain page state associated with the first packet;
  store a page walk link list;
  receive a descriptor of the first packet; and
  initiate a page walk through the page walk link list in response to the descriptor and without a prompt from transmit direct memory access circuitry.

5. A packet processor, comprising:
 a packet memory manager configured to
  receive a single bit indicator that a first packet is a single page; and
  read a second packet in response to the single bit indicator without waiting to obtain page state associated with the first packet,
  guarantee that the state of a first page of a packet is written by the time the descriptor of the packet is received;
  apply a first latency to a second page of the packet, wherein the first latency is the difference between the latency of a packet processor ingress port to fill a full page with packet data and the maximum latency of a control block issuing a descriptor; and
  apply a second latency to each additional page of the packet, wherein the second latency is the latency of the packet processor ingress port to fill a full page with packet data.

* * * * *